United States Patent
Chu et al.

(10) Patent No.: US 10,650,226 B2
(45) Date of Patent: May 12, 2020

(54) FALSE FACE REPRESENTATION IDENTIFICATION

(71) Applicant: Microsoft Technology Licensing, LLC, Redmond, WA (US)

(72) Inventors: Chun-Te Chu, Bellevue, WA (US); Michael J. Conrad, Monroe, WA (US); Dijia Wu, Sammamish, WA (US); Jinyu Li, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 144 days.

(21) Appl. No.: 16/011,894

(22) Filed: Jun. 19, 2018

(65) Prior Publication Data

US 2018/0307895 A1    Oct. 25, 2018

Related U.S. Application Data

(63) Continuation of application No. 15/444,068, filed on Feb. 27, 2017, now Pat. No. 10,007,839, which is a (Continued)

(51) Int. Cl.
*G06K 9/00* (2006.01)
*G06K 9/52* (2006.01)
*G06K 9/46* (2006.01)
*G06T 7/40* (2017.01)
*G06T 7/50* (2017.01)
(Continued)

(52) U.S. Cl.
CPC ..... *G06K 9/00255* (2013.01); *G06K 9/00221* (2013.01); *G06K 9/00248* (2013.01); *G06K 9/00268* (2013.01); *G06K 9/00281* (2013.01); *G06K 9/00288* (2013.01); *G06K 9/00899* (2013.01); *G06K 9/2018* (2013.01); *G06K 9/4652* (2013.01); *G06K 9/52* (2013.01); *G06T 7/40* (2013.01); *G06T 7/50* (2017.01); *G06T 7/60* (2013.01); *G06T 7/90* (2017.01)

(58) Field of Classification Search
CPC .......... A61B 5/442; A61B 5/01; A61B 5/441; A61B 3/113
See application file for complete search history.

(56) References Cited

U.S. PATENT DOCUMENTS 6,271,940 B1 * 8/2001 Deschuytere ........ H04N 1/6033
  358/504
6,940,545 B1 * 9/2005 Ray .................... G06K 9/00228
  348/207.99

(Continued)

*Primary Examiner* — Yosef Kassa
(74) *Attorney, Agent, or Firm* — Alleman Hall Creasman & Tuttle LLP

(57) ABSTRACT

Systems and methods for identifying a false representation of a human face are provided. In one example, a method for identifying a false representation of a human face includes receiving one or more data streams captured by one or more sensors sensing a candidate face. In a plurality of stages that each comprises a different analysis, one or more of the data streams are analyzed, and the stages comprise determining whether a plurality of candidate face depth points lies on a single flat plane or a curving plane. Based at least in part on determining that the plurality of candidate face depth points lies on the single flat plane, an indication of the false representation of the human face is outputted.

20 Claims, 5 Drawing Sheets

Related U.S. Application Data continuation of application No. 15/008,300, filed on Jan. 27, 2016, now Pat. No. 9,582,724, which is a continuation of application No. 14/458,134, filed on Aug. 12, 2014, now Pat. No. 9,251,427.

(51) Int. Cl.
    *G06T 7/90*     (2017.01)
    *G06T 7/60*     (2017.01)
    *G06K 9/20*     (2006.01)

(56) References Cited

U.S. PATENT DOCUMENTS

| | | | |
|---|---|---|---|
| 7,112,806 B2 * | 9/2006 | Lussier | G01N 21/6456 250/458.1 |
| 7,259,785 B2 * | 8/2007 | Stavely | A61B 3/113 348/231.3 |
| 7,583,294 B2 * | 9/2009 | Ray | G06K 9/00228 348/222.1 |
| 7,860,320 B2 * | 12/2010 | Luo | G06K 9/00664 382/227 |
| 8,660,307 B2 * | 2/2014 | Srinivasan | G06K 9/00369 382/103 |

* cited by examiner

FALSE FACE REPRESENTATION IDENTIFICATION

CROSS REFERENCE TO RELATED APPLICATIONS

The present application is a continuation of U.S. patent application Ser. No. 15/444,068 filed Feb. 27, 2017, which is a continuation of U.S. patent application Ser. No. 15/008,300 filed Jan. 27, 2016, now granted as U.S. Pat. No. 9,582,724, which is a continuation of U.S. patent application Ser. No. 14/458,134, filed Aug. 12, 2014, now U.S. Pat. No. 9,251,427, the entire contents of each of which are incorporated herein by reference for all purposes.

BACKGROUND

Face recognition technology may be utilized to identify a person in various applications and contexts. Such applications and contexts may include, for example, computing system natural user interfaces, security systems, identity authentication systems, and the like. However, in some cases facial recognition systems may be deceived by, for example, presenting a printed photograph of a face, displaying a static or video image of a face on device display, or presenting a three-dimensional (3D) mask of a person's face.

In some prior approaches for detecting such deceptions, a single data stream related to a captured image of a face may be analyzed. However, the increasing variety and sophistication of methods for forging face biometrics makes such approaches less effective. Additionally and in some approaches, cooperation and/or movement by the user is needed to effectuate the detection. Such approaches inconvenience a user and present additional delays to the user's intended actions.

SUMMARY

To address the above issues, methods and computing devices for identifying a false representation of a human face are provided. In one example, a method may include receiving a plurality of different data streams captured by a respective plurality of sensors of differing sensor types sensing a candidate face. In a cascading plurality of stages, one or more of the plurality of different data streams may be analyzed, wherein each of the cascading plurality of stages comprises a different analysis. In one of the cascading plurality of stages, the method may determine that one or more of the different data streams corresponds to the false representation of the human face. Based on this determination, an indication of the false representation of the human face may be outputted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
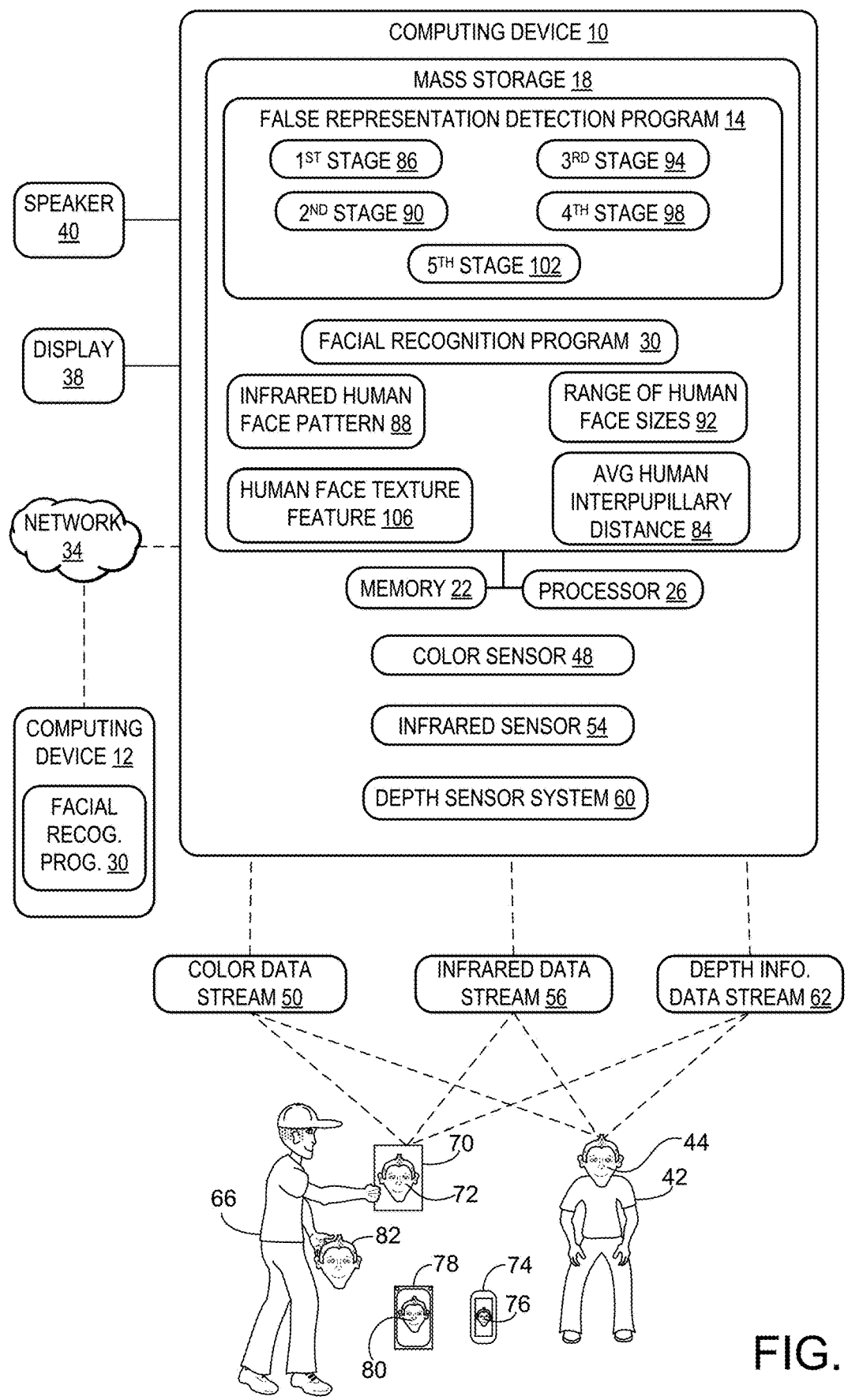
FIG. 1 is a schematic view of a computing device for identifying a false representation of a human face according to an example of the present disclosure.

FIG. 1 is a schematic illustration of a computing device 10 according to an embodiment of the present disclosure. As explained in more detail below, the computing device 10 may be used to perform methods for identifying a false representation of a human face. Computing device 10 may take the form of a gaming console, mobile communication device, multi-touch display device, desktop computer, laptop computer, tablet computer, networking computer, set-top box (e.g. cable television box, satellite television box), or any other type of suitable computing device. In some examples, computing device 10 may comprise an embedded system within a larger electronic or mechanical device or system. Additional details regarding the components and computing aspects of the computing device 10 are described in more detail below with respect to FIG. 5.

The computing device 10 may include a false representation detection program 14 that may be stored in mass storage 18 of the computing device. The false representation detection program 14 may be loaded into memory 22 and executed by a processor 26 of the computing device 10 to perform one or more of the methods and processes for identifying a false representation of a human face and outputting such indication, as described in more detail below.

In some examples, the computing device 10 may also include a facial recognition program 30 that may be stored in mass storage 18, loaded into memory 22 and executed by processor to authenticate the identity of a person. For example, a captured visible image of a person (still image or video) may be analyzed using face recognition techniques and compared to a reference image of the person. Where the captured image matches the reference image, the identity of the person in the captured image may be authenticated. It will be appreciated that any suitable facial recognition techniques, algorithms and technologies may be utilized to perform such identification.

In these examples, the false representation detection program 14 may output an indication of a false representation of a human face to the facial recognition program 30. In response, the facial recognition program 30 may take appropriate action to deny an attempted access, log-on or other request associated with the false representation. In some examples, the false representation detection program 14 may output an indication of a true representation of a human face to the facial recognition program 30. In response, the facial recognition program 30 may proceed to determine an authenticity of the captured image.

In other examples, a facial recognition program 30 may be stored in mass storage of a separate computing device 12 that is communicatively coupled to computing device 10 via a wired connection or a network, such as network 34. Network 34 may take the form of a local area network (LAN), wide area network (WAN), wired network, wireless network, personal area network, or a combination thereof, and may include the Internet. It will be appreciated that the computing device 10 also may be operatively connected with one or more additional devices via network 34.

In some examples, the false representation detection program 14 may alternatively or additionally output an indication of a false representation of a human face to a user via a display 38, audio speaker 40, electronic communication (text message, email, etc.), and/or any other suitable output modality. In some examples, the indication may comprise a value indicating that candidate face data corresponds to a false representation of a human face.

The computing device 10 may include a plurality of sensors of differing sensor types that are each configured to sense different data streams. Each sensor may capture data streams from a subject within the field of view of the sensor, with the data streams including data representing a candidate face that may be an actual human face or a false representation of a human face. FIG. 1 schematically illustrates one example of a human user 42 having a human face 44. It will be appreciated that data including the candidate face may also include features of the face and/or head of the reference subject such as, for example, ears, chin, forehead, hairline, etc.

In some examples the plurality of sensors may comprise a color sensor 48, such as a red-green-blue (RGB) sensor, that captures color image data in a color information data stream 50. The color sensor 48 may comprise a plurality of active pixel sensors, such as CMOS sensors, or any other suitable type of color-capable sensor. The color information data stream 50 may comprise one or more digital images and/or digital video.

In some examples, the plurality of sensors may comprise an infrared (IR) sensor 54 that captures IR radiation data in an IR data stream 56. The IR sensor 54 may comprise a thermographic camera that uses uncooled IR sensors or any other suitable type of IR sensor. The IR data stream 56 may comprise one or more digital images and/or digital video.

In some examples, the plurality of sensors may comprise a depth sensor system 60 that includes one or more depth cameras that generate a depth information data stream 62. Depth sensor system 60 may create a depth map of a candidate face, and also may detect movements within its field of view, such as gesture-based inputs or other movements performed by a person or physical object within the depth cameras' field of view. In one example, each depth camera may include left and right cameras of a stereoscopic vision system. Time-resolved images from one or more of these depth cameras may be registered to each other and/or to images from another optical sensor, such as a color sensor 48, and may be combined to yield depth-resolved video.

In other examples, a structured light depth camera may be configured to project structured IR illumination, and to image the illumination reflected from a candidate face onto which the illumination is projected. A depth map of the candidate face may be constructed based on spacings between adjacent features in the various regions of an imaged face. In still other examples, a depth camera may take the form of a time-of-flight depth camera configured to project a pulsed IR illumination onto a candidate face and detect the illumination reflected from the face. It will be appreciated that any other suitable depth camera may be used within the scope of the present disclosure.

The color sensor 48, IR sensor 54, and depth sensor system 60 may be integrated into the computing device 10 as shown in FIG. 1, or may be physically separated from the computing device.

As noted above, in some situations a dishonorable user may attempt to forge or spoof the facial biometrics of a human face in various manners. As schematically shown in FIG. 1, in one example an imposter 66 may attempt to spoof a facial recognition program 30 with a printed photograph 70 of a printed image 72 of the face 44 of the human user 42. For example, the imposter 66 may be attempting to log on to an on-line social networking account of the user 42 via a web camera of the user's laptop computer that comprises a color sensor 48. The imposter 66 may position the photograph 70 in front of the web camera in an attempt to spoof the facial biometrics of the user's face 44.

In other examples, the imposter 66 may use a mobile communication device 74, such as a smart phone, to display a displayed image 76 of the user's face 44. For example, the imposter 66 may present the displayed image 76 to a camera comprising a color sensor 48 embedded in a desktop display that is communicatively coupled to a desktop computer. In other examples, the imposter 66 may use a multi-touch display device 78, such as a tablet computer, to display a displayed image 80 of the user's face 44. For example, the imposter 66 may present the displayed image 80 to an imaging system in a gaming console comprising a color sensor 48, infrared sensor 54 and depth sensor system 60. In other examples, the imposter 66 may wear a physical, three-dimensional mask 82 made of a life-like material, such as silicone, that is constructed to duplicate the user's face 44.

It will be appreciated that the foregoing examples are merely exemplary, and that other spoofing attempts using other devices, objects or methods for deceiving a facial recognition program 30 may be possible. It will also be appreciated that various other combinations of spoofing attempts and user computing devices also may be attempted.

As schematically shown in the example of FIG. 1, each of the color sensor 48, IR sensor 54 and depth sensor system 60 may receive respective data streams from sensing a candidate face, such as the printed photograph 70 or the actual face 44 of user 42. More particularly, the color data stream 50, IR data stream 56 and depth information data stream 62 may be received by the color sensor 48, IR sensor 54 and depth sensor system 60, respectively. As described in more detail below, the false representation detection program 14 may analyze one or more of these different data streams in a cascading plurality of stages, where each stage comprises a different analysis.

In one potential advantage of the present disclosure, the different analysis of each stage of the cascading plurality of stages may be configured to identify one or more different types of spoofing attempts. In this manner, the cascading plurality of stages may be configured to detect a wide variety of different spoofing attempts. In some examples, each of the different stages and corresponding analyses may be configured to detect a different sub-group of attempted spoofing techniques or modalities. In some examples, two or more of the cascading plurality of stages may be configured to detect the same attempted spoofing technique or modality.

In another potential advantage of the present disclosure, the cascading plurality of stages are arranged and performed sequentially in a predetermined order. As illustrated in FIG. 1 and as described in more detail below, in one example the false representation detection program 14 may comprise a first stage 86, second stage 90, third stage 94, fourth stage 98 and fifth stage 102. It will be appreciated that in other examples, the false representation detection program 14 may comprise fewer stages or more stages than those depicted in FIG. 1.

In some examples, the predetermined order of the cascading plurality of stages may be configured to sequentially detect various spoofing attempts in order of escalating difficulty of detection. A level of detection difficulty of a particular spoofing attempt may correspond to a relative frequency of successful identifications of a false representation of a human face and/or unsuccessful identifications of a false representation of a human face. In other examples, a level of detection difficulty of a particular spoofing attempt may correspond to a computational complexity associated with detecting such an attempt.

In other examples, the predetermined order of the cascading plurality of stages may be configured to sequentially detect various spoofing attempts in order of decreasing commonality of attempts, beginning with more common spoofing attempts and ending with less common spoofing attempts. In this manner, and in another potential advantage of the present disclosure, the false representation detection program 14 may be configured to more quickly identify the more common spoofing attempts, and accordingly decrease delays associated with the detection process.

At each of the cascading plurality of stages, if a determination is reached that one or more of the different data streams corresponds to a false representation of a human face, then the false representation detection program 14 may output a corresponding indication and forego performing any remaining stages in the cascade. Accordingly, and in another potential advantage of the present disclosure, by executing a cascading plurality of stages in this manner, the false representation detection program 14 may decrease the processing time needed to detect a false representation of a human face. User waiting time is also correspondingly reduced.

Additionally and as described in more detail below, each of the cascading plurality of stages avoids incorporating or otherwise utilizing user movement in their analyses. Accordingly and in another potential advantage of the present disclosure, false representations of a human face may be identified without burdening the user with requested user movements or additional user interventions.

Figure 2:
FIG. 2 is an example of an infrared pattern of a human face.

Returning to the example of FIG. 1, a first stage 86 of the cascading plurality of stages may be configured to utilize the infrared data stream 56 to determine whether an infrared candidate face pattern of a candidate face, such as printed image 72 of face 44, matches a predetermined infrared human face pattern 88. In some examples, the wavelength of the IR radiation used to capture the infrared candidate face pattern may be centered at 865 nanometers (nm), and may range between 855 nm to 875 nm. FIG. 2 illustrates an example infrared human face pattern 88.

Figure 3:
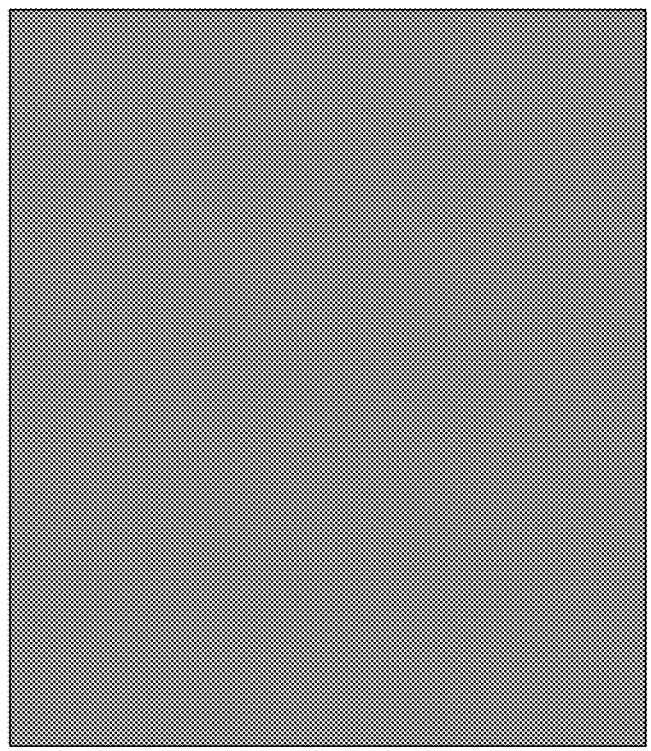
FIG. 3 is an example of an infrared pattern of a printed photograph containing an image of a human face.

In some examples, the false representation detection program 14 may determine whether the infrared candidate face pattern has an IR pattern that is generally characteristic of a human face. As schematically illustrated in FIG. 3, the displayed image 80 of face 44 on multi-touch display device 78 may exhibit a very small or essentially no IR signature, which creates an infrared candidate face pattern 302 that does not match infrared human face pattern 88. In some examples, pattern matching between an infrared candidate face pattern and a predetermined infrared human face pattern 88 may be performed using any suitable statistical classification algorithm. In some examples, the first stage 86 also may utilize color data stream 50 to determine whether a color image of a candidate face, such as printed image 72 of face 44, matches a predetermined color human face.

A second stage 90 of the cascading plurality of stages may be configured to utilize the depth information data stream 62 and the color data stream 50 to determine whether the size of a candidate face, such as displayed image 76 of face 44 on mobile communication device 74, is within a predetermined range of human face sizes 92. In some examples, a predetermined range of human face sizes 92 may comprise a range between an average face size of a young adult to an average face size of a mature adult. It will also be appreciated that any suitable predetermined range of human face sizes may be utilized. For example and as schematically illustrated in FIG. 1, a displayed image 76 of face 44 on mobile communication device 74 may be significantly smaller than the actual face 44 of human user 44, and may not fall within a predetermined range of human face sizes 92.

In some examples, an image distance from the depth sensor system 60 to the displayed image 76 on mobile communication device 74 may be determined utilizing the depth information data stream 62. The false representation detection program 14 may also utilize the color data stream 50 to measure an interpupillary distance between the pupils of the eyes in displayed image 76. For a given image distance from the depth sensor system 60, the false representation detection program 14 may select a predetermined range of average human interpupillary distances that corresponds with such image distance. For example, an average human interpupillary distance 84 may be 64 mm, and an example range of human interpupillary distances may be 52 mm to 78 mm.

The false representation detection program 14 may adjust the example range of human interpupillary distances to account for the image distance. For example, as the image distance increases, the example range of human interpupillary distances may be correspondingly reduced. The false representation detection program 14 may then determine whether the measured interpupillary distance of the eyes in displayed image 76 falls within the adjusted predetermined range of human interpupillary distances. If it does not, then an indication of a false representation of a human face may be outputted.

In other examples, determining whether the size of a candidate face, such as displayed image 80 of face 44 on multi-touch display device 78, is within a predetermined range of human face sizes 92 may comprise measuring the size of a face detection bounding box. The false representation detection program 14 may analyze the color data stream 50 and/or IR data stream 56 to detect the displayed image 80 of face 44, and establish a face detection bounding box around the image. In some examples, the false representation detection program 14 may acquire a face detection bounding box corresponding to the displayed image 80 from a facial recognition program 30.

Using an image distance from the color sensor 48 to the displayed image 80, the false representation detection program 14 may compare the size of the face detection bounding box around the displayed image 80 with a predetermined size of a face detection bounding box around an actual human face that is adjusted for the image distance. The false representation detection program 14 may then determine whether the size of the face detection bounding box around the displayed image 80 falls within an adjusted predetermined range of sizes of face detection bounding boxes of human faces. If it does not, then an indication of a false representation of a human face may be outputted.

In other examples, the false representation detection program 14 may analyze the alignment of one or more facial landmarks in a candidate face to determine a size of the face. Using an image distance to adjust a predetermined range of corresponding facial landmarks of actual human faces as described above, the false representation detection program 14 may then determine whether the size of the candidate face falls within a predetermined range of actual human face sizes.

A third stage 94 of the cascading plurality of stages may be configured to utilize the depth information data stream 62 to determine whether a plurality of candidate face depth points lies on a single flat plane or on a curving plane. It will be appreciated that paper or other flat media containing a printed image of a face will be planar, whether substantially flat or curving. Similarly, a display screen of a display device will typically be planar.

In one example, the false representation detection program 14 may utilize the depth information data stream 62 to generate three-dimensional (3D) coordinates of a candidate face, such as the printed image 72 on photograph 70 of face 44. Using a planar classifier, the 3D coordinates may be fitted to a facial point plane. In some examples, a least squares data fitting method may be used to find the facial point plane. In one example, the false representation detection program 14 may determine if the sum of the distances from the 3D coordinates of the candidate face to the facial point plane is less than a predetermined planar threshold. If they are, then an indication of a false representation of a human face may be outputted.

A fourth stage 98 of the cascading plurality of stages may be configured to analyze a plurality of image frames of the candidate face for changes in color that indicate blood flow in the candidate face. For spoofing attempts that utilize a physical 3D mask or a still image, whether printed or displayed, identifying a lack of blood flow in the candidate face may signal a false representation of a face.

For example, fluctuations in the color of the skin of the candidate face may be analyzed to identify the presence or absence of blood flow. In some examples, the IR data stream 56 and/or color data stream 50 may be analyzed to identify such fluctuations. Frame-by-frame video data may be provided to a blood flow identification classifier that identifies patterns over time consistent with blood flow and/or a human pulse.

A fifth stage 102 of the cascading plurality of stages may be configured to extract a candidate face texture feature from one or more of the color data stream 50 and the IR data stream 56 of a candidate face. Using the candidate face texture feature, the false representation detection program 14 may determine whether the candidate face texture feature corresponds to a human face texture feature 106.

It will be appreciate that the texture of actual human skin is very different from the texture of paper or other printed media, a display screen, or a 3D silicone mask. For example, image artifacts representing texture differences between an actual human face and a false representation of a face may be identified in the color data stream 50 and/or IR data stream 56. In some examples, the false representation detection program 14 may extract one or more candidate face texture features from images of the candidate face. Such features may be analyzed using a classifier trained to differentiate actual human face texture features 106 from texture features of a false representation of a face.

In some examples, a local binary pattern (LBP) feature vector and Difference of Gaussians (DoG) feature enhancement algorithm may be utilized to differentiate actual human face texture features 106 from texture features of a false representation of a face. In some examples, a support vector machine (SVM), random forest classifier, and/or other supervised learning models with associated learning algorithms may be utilized to analyze the data and recognize patterns consistent with either a human face or a false representation of a face.

In some examples, a false representation of a human face may exhibit a high frequency component loss that exceeds a predetermined loss threshold. For example, a printed image of a photograph of a human face will lose high frequency information and corresponding detail during compression of the digital image and rendering and printing of the compressed image onto media. In some examples, a region of the candidate face may be analyzed to determine an amount of variation in color data in that region. Such amount may then be compared to a predetermined reference amount of color data variation corresponding to an image of an actual human face captured directly by one of the sensors. Using such comparison, a color variation component loss may be determined. If such color variation component loss exceeds a predetermined loss threshold, then the false representation detection program 14 may output an indication of a false representation of a human face.

In some examples, data generated by the false representation detection program 14 may be provided to a cloud-based system via network 34 to facilitate improvement of the program. For example, data related to each of the cascading plurality of stages, such as frequency of successful false representation detection, false positives, and the like, may be utilized to enhance performance of the false representation detection program 14.

Figure 4A:
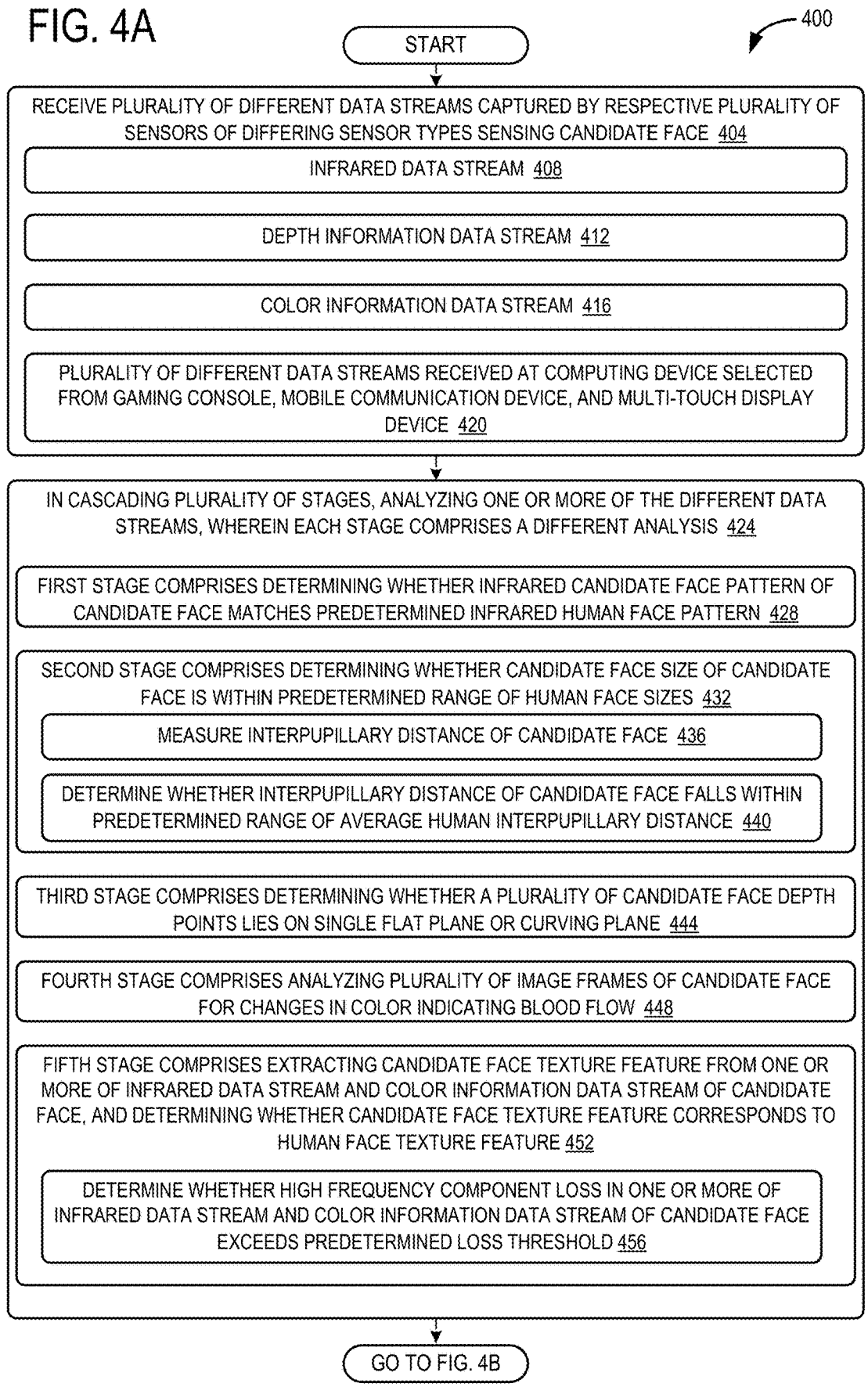
FIGS. 4A and 4B are a flow diagram illustrating a method for identifying a false representation of a human face according to one example of the present disclosure.
Figure 4B:
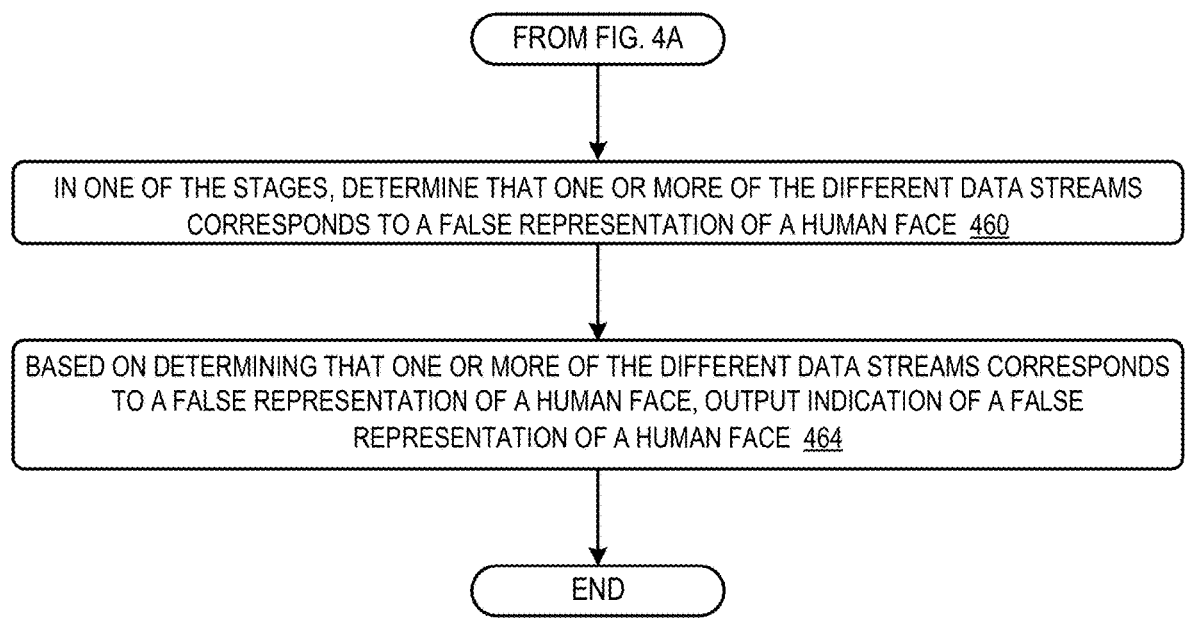

Turning now to FIGS. 4A and 4B, an example of a method 400 for identifying a false representation of a human face will now be described. The method 400 may be performed using the hardware and software components of the computing device 10 described above, or using any other suitable components.

At 404 the method 400 may include receiving a plurality of different data streams captured by a respective plurality of sensors of differing sensor types sensing a candidate face. At 408 the plurality of different data streams may comprise an infrared data stream. At 412 the plurality of different data streams may comprise a depth information data stream. At 416 the plurality of different data streams may comprise a color information data stream. At 420 the plurality of different data streams of a candidate face may be received at a computing device selected from the group consisting of a gaming console, a mobile communication device, and a multi-touch display device.

At 424 the method 400 may include, in a cascading plurality of stages, analyzing one or more of the plurality of different data streams, wherein each of the cascading plurality of stages comprises a different analysis. At 428 the method 400 may include a first stage comprising determining whether an infrared candidate face pattern of the candidate face matches a predetermined infrared human face pattern.

At 432 the method 400 may include a second stage comprising determining whether a candidate face size of the candidate face is within a predetermined range of human face sizes. At 436 the method 400 may include determining whether a candidate face size of the candidate face is within a predetermined range of human face sizes by measuring an interpupillary distance of the candidate face. At 440 the method 400 may include determining whether the interpupillary distance of the candidate face falls within a predetermined range of an average human interpupillary distance.

At 444 the method 400 may include a third stage comprising determining whether a plurality of candidate face depth points lies on a single flat plane or a curving plane. At 448 the method 400 may include a fourth stage comprising analyzing a plurality of image frames of the candidate face for changes in color that indicate blood flow in the candidate face. At 452 the method 400 may include a fifth stage comprising extracting a candidate face texture feature from one or more of the infrared data stream and the color information data stream of the candidate face, and determining whether the candidate face texture feature corresponds to a human face texture feature. At 456 the method 400 may include determining whether a high frequency component loss in one or more of the infrared data stream and the color information data stream of the candidate face exceeds a predetermined loss threshold.

With reference now to FIG. 4B, at 460 the method 400 may include, in one of the cascading plurality of stages, determining that one or more of the different data streams corresponds to the false representation of the human face. At 464 the method 400 may include, based on determining that one or more of the different data streams corresponds to the false representation of the human face, outputting an indication of the false representation of the human face.

It will be appreciated that method 400 is provided by way of example and is not meant to be limiting. Therefore, it is to be understood that method 400 may include additional and/or alternative steps than those illustrated in FIGS. 4A and 4B. Further, it is to be understood that method 400 may be performed in any suitable order. Further still, it is to be understood that one or more steps may be omitted from method 400 without departing from the scope of this disclosure.

Figure 5:
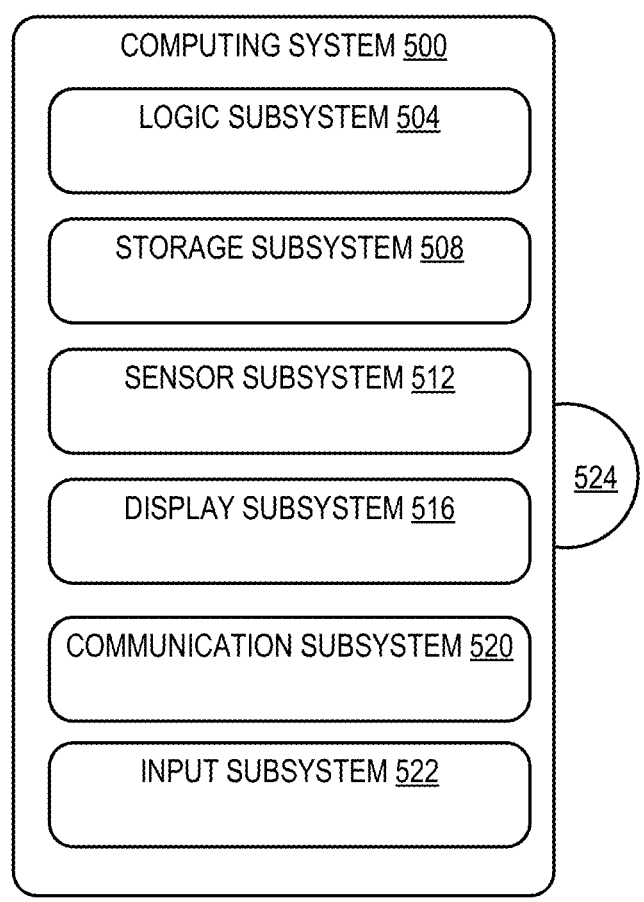
FIG. 5 is a simplified schematic illustration of an embodiment of a computing device.

FIG. 5 schematically shows a nonlimiting example of a computing system 500 that may perform one or more of the above described methods and processes. Computing device 10 and computing device 12 may take the form of or include one or more aspects of computing system 500. Computing system 500 is shown in simplified form. It is to be understood that virtually any computer architecture may be used without departing from the scope of this disclosure. In different examples, computing system 500 may take the form of a mainframe computer, server computer, desktop computer, tablet computer, home entertainment computer, gaming console, network computing device, tablet, notebook, smartphone, multi-touch display device, or other mobile computing device, mobile communication device, etc.

As shown in FIG. 5, computing system 500 includes a logic subsystem 504 and a storage subsystem 508. Computing system 500 may optionally include a sensor subsystem 512, display subsystem 516, communication subsystem 520, input subsystem 522 and/or other subsystems and components not shown in FIG. 5. Computing system 500 may also include computer readable media, with the computer readable media including computer readable storage media and computer readable communication media. Computing system 500 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 504 may include one or more physical devices configured to execute one or more instructions. For example, the logic subsystem 504 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 504 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 508 may include one or more physical, persistent devices configured to hold data and/or instructions executable by the logic subsystem 504 to implement the herein described methods and processes. When such methods and processes are implemented, the state of storage subsystem 508 may be transformed (e.g., to hold different data).

Storage subsystem 508 may include removable media and/or built-in devices. Storage subsystem 508 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 508 may include devices with one or more of the following characteristics: volatile, nonvolatile, dynamic, static, read/write, read-only, random access, sequential access, location addressable, file addressable, and content addressable.

In some examples, aspects of logic subsystem 504 and storage subsystem 508 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 5 also shows an aspect of the storage subsystem 508 in the form of removable computer readable storage media 524, which may be used to store data and/or instructions executable to implement the methods and processes described herein. Removable computer-readable storage media 524 may take the form of CDs, DVDs, HD-DVDs, Blu-Ray Discs, EEPROMs, and/or floppy disks, among others.

It is to be appreciated that storage subsystem 508 includes one or more physical, persistent devices. In contrast, in some implementations aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, sensor subsystem 512 may include one or more sensors configured to sense different physical phenomenon (e.g., visible light, infrared light, sound, acceleration, orientation, position, etc.) as described above. Sensor subsystem 512 may be configured to provide sensor data to logic subsystem 504, for example. Such data may include image information, ambient lighting information, depth information, gaze tracking information, audio information, position information, motion information, user location information, and/or any other suitable sensor data that may be used to perform the methods and processes described above.

When included, display subsystem 516 may be used to present a visual representation of data held by storage subsystem 508. As the above described methods and processes change the data held by the storage subsystem 508, and thus transform the state of the storage subsystem, the state of the display subsystem 516 may likewise be transformed to visually represent changes in the underlying data. The display subsystem 516 may include one or more display devices utilizing virtually any type of technology. Such display devices may be combined with logic subsystem 504 and/or storage subsystem 508 in a shared enclosure, or such display devices may be peripheral display devices.

When included, communication subsystem 520 may be configured to communicatively couple computing system 500 with one or more networks and/or one or more other computing devices. Communication subsystem 520 may include wired and/or wireless communication devices compatible with one or more different communication protocols. As nonlimiting examples, the communication subsystem 520 may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

When included, input subsystem 522 may comprise or interface with one or more sensors or user-input devices such as a game controller, gesture input detection device, voice recognizer, inertial measurement unit, keyboard, mouse, or touch screen. In some embodiments, the input subsystem 522 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of computing device 10 that is implemented to perform one or more particular functions. In some cases, such a program may be instantiated via logic subsystem 504 executing instructions held by storage subsystem 508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for identifying a false representation of a human face, the method comprising:
receiving one or more data streams captured by one or more sensors sensing a candidate face;
in a plurality of stages that each comprises a different analysis, analyzing one or more of the data streams, wherein the plurality of stages comprises determining whether a plurality of candidate face depth points lies on a single flat plane or a curving plane; and
based at least in part on determining that the plurality of candidate face depth points lies on the single flat plane, outputting an indication of the false representation of the human face.

2. The method of claim 1, wherein the one or more data streams comprise an infrared data stream, and the stages comprise determining whether an infrared candidate face pattern of the candidate face matches a predetermined infrared human face pattern.

3. The method of claim 1, wherein the stages comprise determining whether a candidate face size of the candidate face is within a predetermined range of human face sizes.

4. The method of claim 3, wherein determining whether the candidate face size of the candidate face is within a predetermined range of human face sizes further comprises determining whether an interpupillary distance of the candidate face falls within a predetermined range of an average human interpupillary distance.

5. The method of claim 1, wherein the stages comprise analyzing a plurality of image frames of the candidate face for changes in color that indicate blood flow in the candidate face.

6. The method of claim 1, wherein the stages comprise:
extracting a candidate face texture feature from one the data streams; and
determining whether the candidate face texture feature corresponds to a human face texture feature.

7. The method of claim 1, wherein the stages comprise determining whether a high frequency component loss in one or more of the data streams exceeds a predetermined loss threshold.

8. A computing device for identifying a false representation of a human face, the computing device comprising:
one or more sensors configured to sense a candidate face;
a false representation detection program executed by a processor of the computing device, the false representation detection program configured to:
receive one or more data streams captured by the one or more sensors;
in a plurality of stages that each comprises a different analysis, analyzing one or more of the data streams, wherein the plurality of stages comprises analyzing a plurality of image frames of the candidate face for changes in color that indicate blood flow in the candidate face; and based at least in part on identifying a lack of blood flow in the candidate face, outputting an indication of the false representation of the human face.

9. The computing device of claim 8, wherein the stages are arranged in order of escalating complexity associated with detecting the spoofing attempts.

10. The computing device of claim 8, wherein the one or more data streams comprise an infrared data stream, and the stages comprise determining whether an infrared candidate face pattern of the candidate face matches a predetermined infrared human face pattern.

11. The computing device of claim 8, wherein the stages comprise determining whether an interpupillary distance of the candidate face falls within a predetermined range of an average human interpupillary distance.

12. The computing device of claim 8, wherein the stages comprise determining whether a plurality of candidate face depth points lies on a single flat plane or a curving plane.

13. The computing device of claim 8, wherein the stages comprise:
   extracting a candidate face texture feature from one the data streams; and
   determining whether the candidate face texture feature corresponds to a human face texture feature.

14. The computing device of claim 8, wherein the stages comprise determining whether a high frequency component loss in one or more of the data streams exceeds a predetermined loss threshold.

15. A method for identifying a false representation of a human face, the method comprising:
   receiving one or more data streams captured by one or more sensors sensing a candidate face;
   in a plurality of stages that each comprises a different analysis, analyzing one or more of the data streams, wherein the plurality of stages comprises determining whether a high frequency component loss in one or more of the data streams exceeds a predetermined loss threshold; and
   based at least in part on determining that the high frequency component loss in one or more of the data streams exceeds the predetermined loss threshold, outputting an indication of the false representation of the human face.

16. The method of claim 15, wherein the stages are arranged in order of escalating complexity associated with detecting the spoofing attempts.

17. The method of claim 15, wherein the one or more data streams comprise an infrared data stream, and the stages comprise determining whether an infrared candidate face pattern of the candidate face matches a predetermined infrared human face pattern.

18. The method of claim 15, wherein the stages comprise determining whether a candidate face size of the candidate face is within a predetermined range of human face sizes.

19. The method of claim 18, wherein determining whether the candidate face size of the candidate face is within a predetermined range of human face sizes further comprises determining whether an interpupillary distance of the candidate face falls within a predetermined range of an average human interpupillary distance.

20. The method of claim 15, wherein the stages comprise analyzing a plurality of image frames of the candidate face for changes in color that indicate blood flow in the candidate face.

* * * * *